United States Patent
Morriss et al.

(10) Patent No.: US 6,542,557 B2
(45) Date of Patent: Apr. 1, 2003

(54) METHOD AND APPARATUS FOR HIGH SPEED SIGNALING

(75) Inventors: Jeffrey C. Morriss, Cornelius, OR (US); Venkatraman Lyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/043,594

(22) Filed: Jan. 9, 2002

(65) Prior Publication Data

US 2002/0054658 A1 May 9, 2002

Related U.S. Application Data

(63) Continuation of application No. 09/089,923, filed on Jun. 3, 1998, now Pat. No. 6,359,951.

(51) Int. Cl.[7] .......................... H03K 9/00; H04L 27/06; H04L 27/14; H04L 27/22

(52) U.S. Cl. ....................................... 375/316; 370/522
(58) Field of Search ................................. 375/369, 256, 375/257, 259, 260, 316; 370/473, 498, 522; 326/30, 49, 50, 80, 81, 83, 86, 87

(56) References Cited

U.S. PATENT DOCUMENTS

| 5,254,883 A | 10/1993 | Horowitz et al. |
| 5,341,131 A | 8/1994 | Hoshino et al. |
| 5,621,901 A | 4/1997 | Morriss et al. |
| 5,819,051 A | 10/1998 | Murray et al. |

*Primary Examiner*—Jean Corrielus
(74) *Attorney, Agent, or Firm*—Blakely, Sokoloff, Taylor & Zafman LLP

(57) ABSTRACT

Briefly, in accordance with one embodiment of the invention, a method of performing high speed signaling includes the following. A preamble signal and an end of packet (EOP) signal are transmitted at a low frequency using rail-to-rail voltage signal levels. Later, high frequency signaling is transmitted using a voltage signal level swing that is less than rail-to-rail.

3 Claims, 4 Drawing Sheets

METHOD AND APPARATUS FOR HIGH SPEED SIGNALING

RELATED APPLICATIONS

This patent application is a continuation patent application of U.S. patent application Ser. No. 09/089,923, titled "Method and Apparatus for High Speed Signaling," by Morriss, filed on Jun. 3, 1998, and assigned to the assignee of the present invention now U.S. Pat. No. 6,359,951. Likewise, U.S. patent application Ser. No. 09/089,932, titled "Signaling Circuit with Substantially Constant Output Impedance," by Morriss now U.S. Pat. No. 6,359,951, was concurrently filed with the foregoing parent patent application, issued as U.S. Pat. No. 6,154,060, on Nov. 28, 2000, is herein incorporated by reference, and is also assigned to the assignee of the present invention.

BACKGROUND

1. Field

The present invention relates to signaling techniques between various platforms and, more particularly, to high speed signaling techniques for such communication.

2. Background Information

A variety of signaling protocols exist for communication via a bus or cable between a computer or host and a computer peripheral, for example. One such protocol or specification comprises the standard Universal Serial Bus (USB) specification, version 1.0, available from USB-IF, 2111 NE 25th. Ave. MS-JF2-51, Hillsboro Oreg. 97124. (hereinafter, "USB specification"). Although devices and other equipment that engage in signaling complying with the USB specification are gaining an increased presence in the marketplace, one disadvantage of this particular specification is that it is limited to operate at twelve (12) megabits per second (mb/s). Due to increasing microprocessor speeds, for example, a desire for high speed signaling relative to 12 mb/s, for example, is present and continues to gain momentum. It would be desirable if a technique existed in which relatively low speed signaling, such as 12 mb/s, for example, could be made compatible with a high speed signaling technique so that this high speed signaling is transparent to legacy devices performing low speed signaling.

SUMMARY

Briefly, in accordance with one embodiment of the invention, a method of performing high speed signaling includes the following. A preamble signal and an end of packet (EOP) signal are transmitted at a low frequency using rail-to-rail voltage signal levels. Later, high frequency signaling is transmitted using a voltage signal level swing that is less than rail-to-rail.

BRIEF DESCRIPTION OF THE DRAWINGS

The subject matter regarded as the invention is particularly pointed out and distinctly claimed in the concluding portions of the specification. The invention, however, both as to organization and method of operation, together with objects, features and advantages thereof, may best be understood by reference to the following detailed description, when read with the accompanying drawings in which:

DETAILED DESCRIPTION

Figure 1:
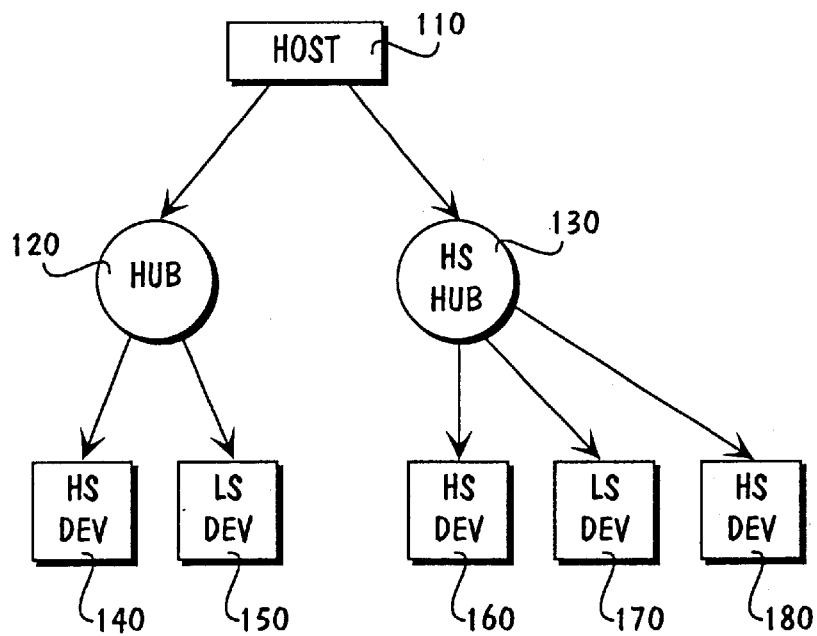
FIGS. 1–4 are schematic diagrams illustrating alternative modes of operation of an embodiment of a system including devices, hubs, and a host that may employ an embodiment of a method of high speed signaling in accordance with the present invention.

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention As previously indicated, it would be desirable for a high speed signaling technique supporting a high speed channel to also be compatible with low speed signaling devices, such as, for example, devices complying with the standard USB specification. Of course, the invention is not limited in scope to the USB specification. In this context, high and low speed signaling refers to relative high and low frequency signaling. For this to occur, it is desirable to control "connectivity" between devices during this high speed signaling in such a manner that devices complying with the standard USB specification ignore or are not affected by the high speed signaling. In this context, "connectivity" refers to a device, hub or other node being in a state to recognize a particular signal. It is desirable for the voltage signaling levels employed in the high speed signaling technique to constitute undefined voltage signal levels for devices using the standard or relatively low speed signaling techniques, such as, for example, signaling complying with the USB specification. However, because these legacy devices may have difficulty handling undefined signals, it would be desirable to create a mechanism that ensures these high speed undefined signals are not transmitted to these devices. In this context, this is referred to as "tearing down connectivity." Likewise, for hubs to provide both high speed and relatively low speed signaling capability, it is desirable that they propagate signaling to downstream devices and hubs in a manner that assures connectivity at the high speed. For example, at 12 megabits per second, it is possible to propagate signaling by regenerating received signals via combinatorial logic, for example. However, at relatively high speeds, skewing, caused at least in part by propagating signals through multiple hubs, may be excessive. Therefore, it is desirable, when high speed signaling is employed at a hub, for example, that the signals be buffered in an elasticity buffer, and, for example, be reclocked using that hub's local clock domain, and then be resent or retransmitted.

As previously suggested, an aspect of providing both high speed and relatively low speed signaling capability may involve preventing high speed signaling from reaching those standard USB specification compliant devices that cannot successfully comprehend the high speed signaling, while also ensuring that the high speed signaling successfully reaches those devices able to successfully comprehend the high speed signaling. In this particular embodiment, this may be achieved using a preamble signal, sent in this particular embodiment at 12 megabits per second, which precedes the high speed signaling in both the upstream and downstream directions, as shall be explained in more detail hereinafter. Likewise, in this embodiment, the 12 mb/s preamble is short with respect to the high speed data packet. For example, a 16 "bit time" preamble may be employed. Of course, the invention is not limited in scope to low speed signaling of 12 mb/s or to a particular preamble.

This particular embodiment of a method of performing high speed signaling in accordance with the invention includes the following. A preamble signal and an end of packet (EOP) signal are transmitted at relatively low speeds using rail-to-rail voltage signal levels, such as $V_{ss}$ and $V_{cc}$ in this embodiment. In this particular embodiment, differential signaling is employed. Later, a high speed signal is transmitted using voltage signal levels $V_s$ and $V_c$ in this embodiment, where $V_s<V_{ss}$ and $V_c>V_{cc}$. Therefore, in this embodiment, rail-to-rail voltage signal levels comprise from $V_{ss}$ to $V_{cc}$ peak-to-peak and a limited voltage signal level swing comprises from $V_s$ to $V_c$ peak-to-peak.

FIG. 1 is a schematic diagram illustrating an embodiment of a system that may employ an embodiment of a high speed signaling technique in accordance with the invention. The transmission of a preamble signal, as previously described, has occurred. The preamble may be received, for example, in one embodiment, by all standard USB specification compliant devices and hubs as well as by devices and hubs capable of high speed signaling. In this context, the term hub refers to a node that receives a signal and transmits it to multiple destinations. However, the preamble signal, which, in this embodiment, includes a synchronization signal and a packet identification (PID) signal, is ignored by devices that comply with the standard USB specification because here the packet identifier (PID) signal is undefined for devices complying with the standard USB specification. Likewise, hubs complying with the standard USB specification upon receiving an end of packet (EOP) signal at the end of the preamble, will "tear down" connectivity, and return to their wait for start of packet (WFSPO) state. In contrast, hubs having high speed signaling capability will, in response to the preamble, modify their internal connectivity to receive higher speed signaling in order to buffer it and retransmit it downstream along paths having hubs or devices that have previously been identified to this hub as being coupled to a high speed signaling capable device or devices. The preamble may be sent either from the host or from a downstream device to establish connectivity for high speed signaling, depending on the embodiment.

Figure 2:
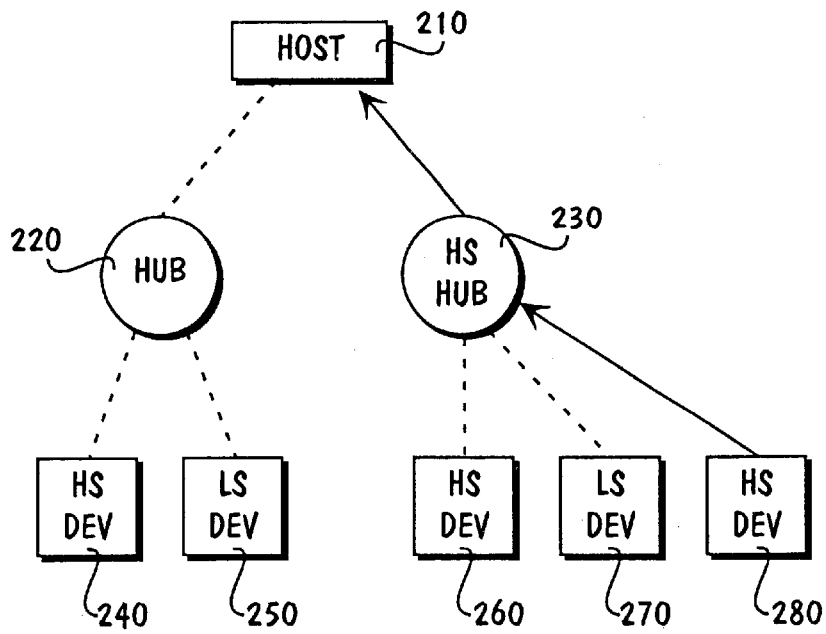

As FIG. 1 illustrates, in this embodiment, connectivity as a result of transmitting the preamble is substantially identical to standard low speed signaling connectivity for USB specification compliant devices and is maintained until the EOP signal is detected, although the invention is not limited in scope in this respect. Therefore, FIG. 1 depicts connectivity before the EOP signal has been detected. However, after the preamble signal has been received, and in response to receiving the EOP signal, as previously indicated, all hubs not capable of supporting high speed signaling, in this particular embodiment, "tear down" connectivity and return to the wait for start of packet (WFSOP) state. As previously indicated, devices complying with the standard USB specification will ignore the PID signal, which for them is undefined. Likewise, hubs that are high speed signaling capable use the EOP signal at the end of the preamble to tear down connectivity to those downstream ports which are not coupled to high speed signaling capable devices. They also use the EOP signal to establish high speed connectivity with or to high speed capable devices. In contrast with FIG. 1 for downstream connectivity, FIG. 2 illustrates upstream connectivity complying with the USB specification.

Figure 3:
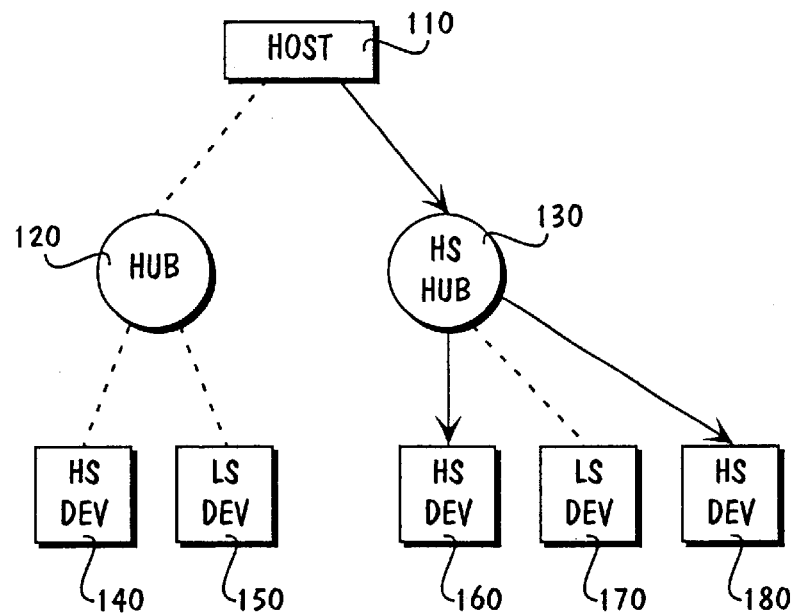

FIG. 3 illustrates downstream connectivity for a high speed signaling capable bus after the preamble and EOP signals have been detected. High speed signaling capable hubs maintain high speed signaling capability until a high speed end-of-packet (EOP) signal is detected, at which time these hubs also "tear down" connectivity and return to the wait for start of packet (WFSOP) state. As previously indicated, a 12 megabit per second preamble signal precedes the high speed signaling in both the upstream and downstream direction. This occurs so that the hubs are notified that high speed signaling is about to commence whether in an upstream or downstream direction.

Figure 4:
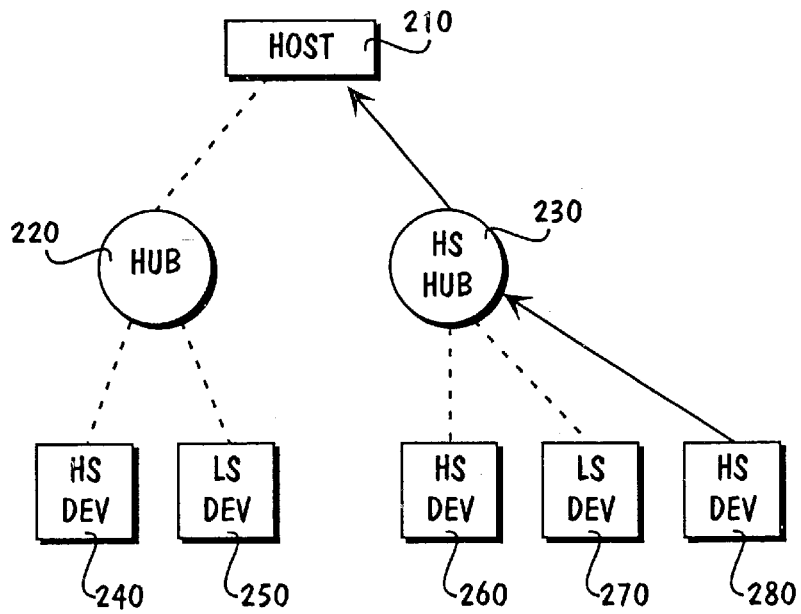

The connectivity response to an upstream directed high speed signaling packet is similar to connectivity for hubs complying with the standard USB specification in that traffic is propagated toward the root port. This is illustrated by FIG. 4. Thus, in the upstream case, the preamble signal and EOP signal connectivity are substantially the same as illustrated in FIG. 2. One difference, however, in this embodiment, is that the preamble is transmitted at 12 megabits per second through the hub via a combinatorial path, while the higher speed signaling capable transmission involves reclocking and buffering the high speed signaling traffic. For the FIG. 2 embodiment, high speed upstream signaling is not employed.

In this embodiment, the high speed packets have an in-band EOP signal defined as a control character in this embodiment. These control characters are employed in part because it is undesirable in high speed signaling to use single ended signaling due to inherent signal skewing in low voltage level signaling. The ground return path may introduce an intolerable amount of noise relative to the frequency of the high speed signal, and differential signaling avoids this. In response to the high speed EOP signal, such as a control character, the high speed signaling capable hubs tear down connectivity, deselect their high speed capable input/output circuitry, and re-enable their input/output circuitry complying with the standard USB specification.

Figure 5:
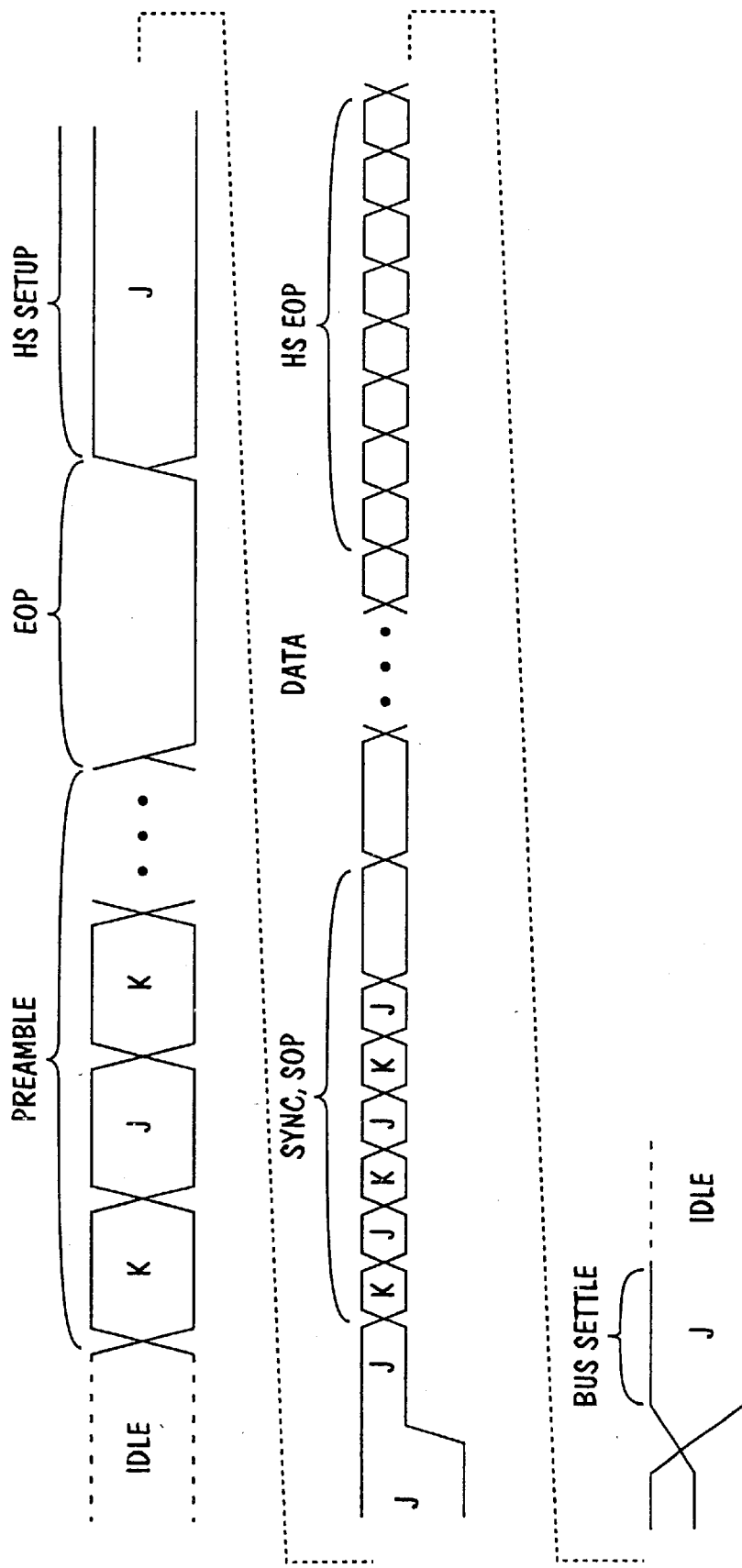
FIG. 5 is a timing diagram illustrating one embodiment of a packet that may be produced to comply with an embodiment of a method of high speed signaling in accordance with the present invention.

FIG. 5 is a timing diagram illustrating an embodiment of a particular signal that may be employed in connection with an embodiment of a method of high speed signaling in accordance with the present invention. In FIG. 5, vertical placement represents voltage level and horizontal placement represents elapsed time. Of course, these relative placements are not to scale and this diagram is provided purely for illustration purposes. Nonetheless, FIG. 5 illustrates that in this embodiment, the data packets are sent at high frequencies having voltage signal levels peak-to-peak that are less than the peak-to-peak voltage signal levels of the low speed portion of the signal. In this embodiment, due in part to the presence of the preamble signaling overhead, USB specification compliant token and handshake signaling is sent at 12 megabits per second. In this particular embodiment, high speed transactions correspond to either bulk or ISO type USB specification compliant transfers, as defined in chapter 8 of the USB specification. ISO (isynchronous) transfers are similar to bulk transfers, but do not return a handshake. Also, ISO transactions provide certain guarantees regarding latency and bandwidth, while bulk transactions provide certain guarantees regarding delivery with reduced errors. Therefore, in this embodiment, a high speed bulk "transaction" comprises: a 12 megabits per second token signal, a data phase comprising a 12 megabits per second preamble signal followed by a high speed data packet, as illustrated in FIG. 5, followed by a 12 megabits per second handshake signal. If the device is unable to transmit data, it may return a 12 megabits per second handshake signal in place of the data signals. In accordance with the USB specification protocol, a data receiver unable to accept more data may signal this to the transmitter by returning a handshake in place of data. Likewise, an ISO "transaction" comprises a 12 megabits per second token signal following by a preamble signal and a high speed data packet.

When a preamble signal, which in this embodiment includes a low speed sync signal, is issued by the host, the sync signal results in connectivity being established between the host and the downstream low or high speed signaling capable devices. When issued by a downstream device, the preamble signal, including a sync signal, results in connectivity being established between the initiating device and the host. Both of these situations are illustrated in FIGS. 1–4. It should be apparent that high speed signaling capable devices also include the capability of communicating at 12 megabits per second.

Figure 6:
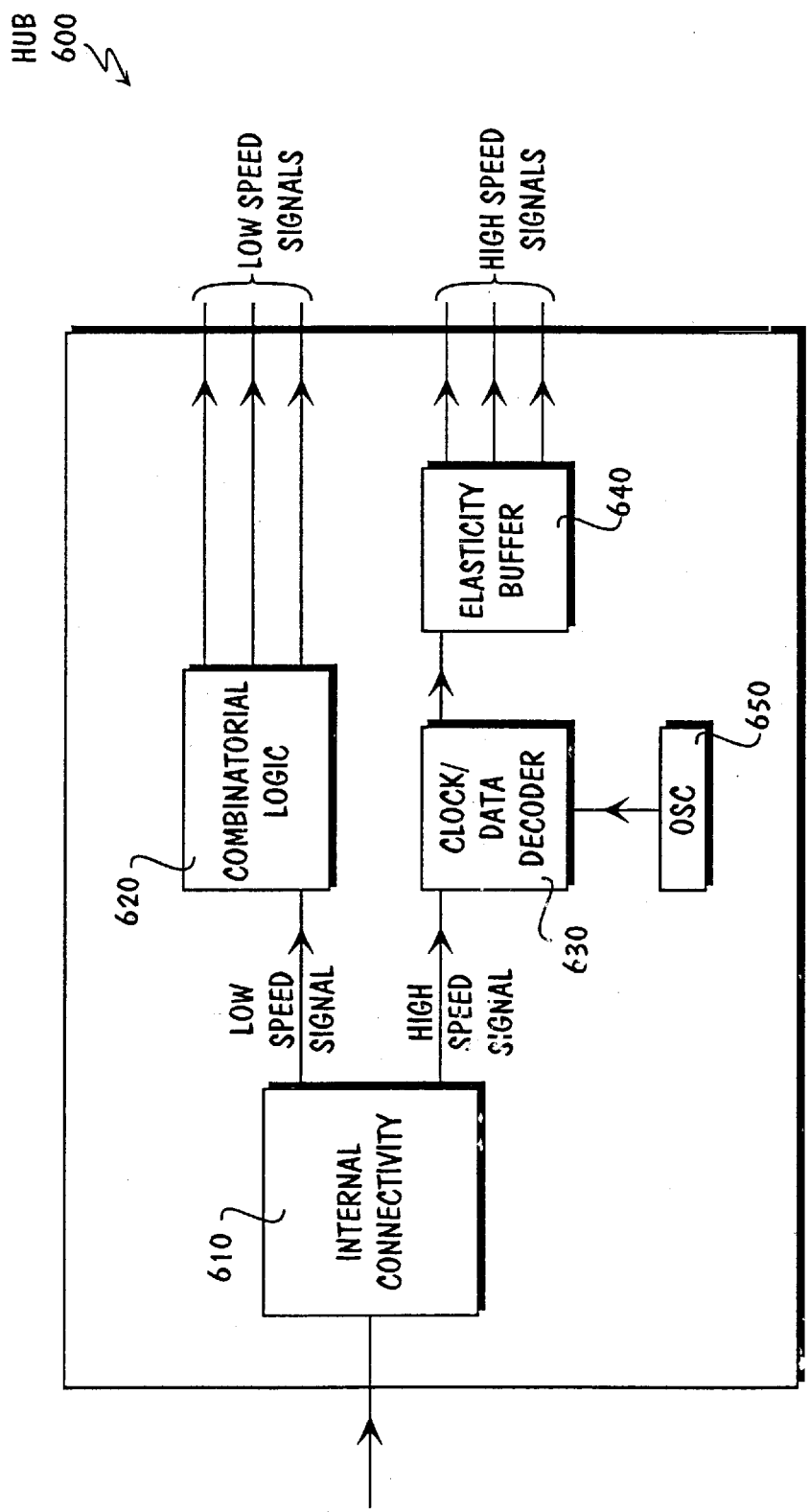
FIG. 6 is a schematic diagram illustrating an embodiment of a hub employing an embodiment of a method of high-speed signaling capability in accordance with the present invention.

At the end of the preamble signal, as previously indicated, devices complying with the standard USB specification detect an undefined PID signal and will ignore the high speed data packet. Likewise, hubs complying with the standard USB specification detect the EOP signal, tear down connectivity and return to idle. At the end of the preamble signal, hubs having high speed signaling capability disable downstream ports not coupled to high speed signaling capable devices from receiving and propagating high speed signaling. Likewise, the hubs are prepared to receive data signals at the voltage levels appropriate for high speed signaling, as previously discussed. Likewise, the hubs having high speed signaling capability modify their internal connectivity such that they perform clock extraction and data recovery on incoming data signals. An embodiment of this internal structure is illustrated in FIG. 6. In this embodiment, data signals are stored in an elasticity buffer to compensate for differences between the transmitting clock and the receiving clock for the hub and then the signals are transmitted from the elasticity buffer. Data, in this embodiment, is received by the hub and is loaded into the elasticity buffer at a rate determined by the sender. The data is read out of the elasticity buffer and transmitted from the hub at a rate determined by the hub's local clock domain frequency. Therefore the elasticity buffer is of sufficient depth to compensate for any cumulative bit rate differences between the sender and the hub itself. Thus, the hub includes the capability to receive and forward high speed data signals. One embodiment of a circuit having the capability to transmit low speed rail-to-rail voltage signals and high speed voltage signals having a peak-to-peak voltage signal less than rail-to-rail is described in the aforementioned patent application "Signaling Circuit with Substantially Constant Output Impedance," although the invention is not limited in scope in this respect.

The hub having high speed signaling capability will receive and forward high speed data signals until it receives an EOP signal in this particular embodiment. Because in some embodiments the high speed signaling may use an embedded clock scheme, the sender may generate a transition density designed for operation of the receiver's data/clock extraction circuit. Various signaling schemes may be used to achieve this, including, but not limited to 4B/5B and 8B/10B. The advantage of these schemes is their ease of implementation in hardware and the existence of in-band control characters which may be used to denote an end of packet, for example. The EOP signal may be sent as an in-band control character in this particular embodiment, as previously indicated. The hub then reverts to $V_{ss}/V_{cc}$ or rail-to-rail voltage level signaling and drives the bus to a "J" state in this particular embodiment, as illustrated in FIG. 5, so that the bus will be in an idle state when floating. A J state refers to a state in which both the D+ lines is at its electrical high state and the D– line is at its electrical low state. The combination of the two defines a logical one on the bus. In this embodiment, an idle is defined by the pullup/pulldown resistors on the bus in which the D+ line is pulled near $V_{cc}$ and the D– line is pulled near $V_{ss}$. In this embodiment, the hub thus tears down its high speed connectivity, floats its busses, switches its receivers to detect $V_{ss}/V_{cc}$ voltage level signaling, and returns to the idle state. Therefore, an embodiment of a bilingual transceiver relatively insensitive to DC offsets due to signal reflections has been described.

While certain features of the invention have been illustrated and described herein, many modifications, substitutions, changes, and equivalents will now occur to those skilled in the art. It is, therefore, to be understood that the appended claims are intended to cover all such modifications and changes that fall within the true spirit of the invention.

What is claimed is:

1. A method of performing high speed signaling comprising:
   receiving an end-of-packet (EOP) signal at a low frequency using rail-to-rail voltage signal levels; and
   after the received low frequency EOP signal, receiving a data signal at a high frequency using a limited voltage signal level swing that is less than rail-to-rail.

2. The method of claim 1, further comprising:
   extracting a high frequency clock and data signal form the received data signal; and
   buffering the extracted signals.

3. The method of claim 2, further comprising:
   transmitting the extracted signals at the high frequency using the limited voltage level swing.

* * * * *